March 31, 1925.                                                     1,531,668
J. W. LEGG
ELECTRIC ARC CONTROL
Filed Dec. 21, 1920                                  2 Sheets-Sheet 1
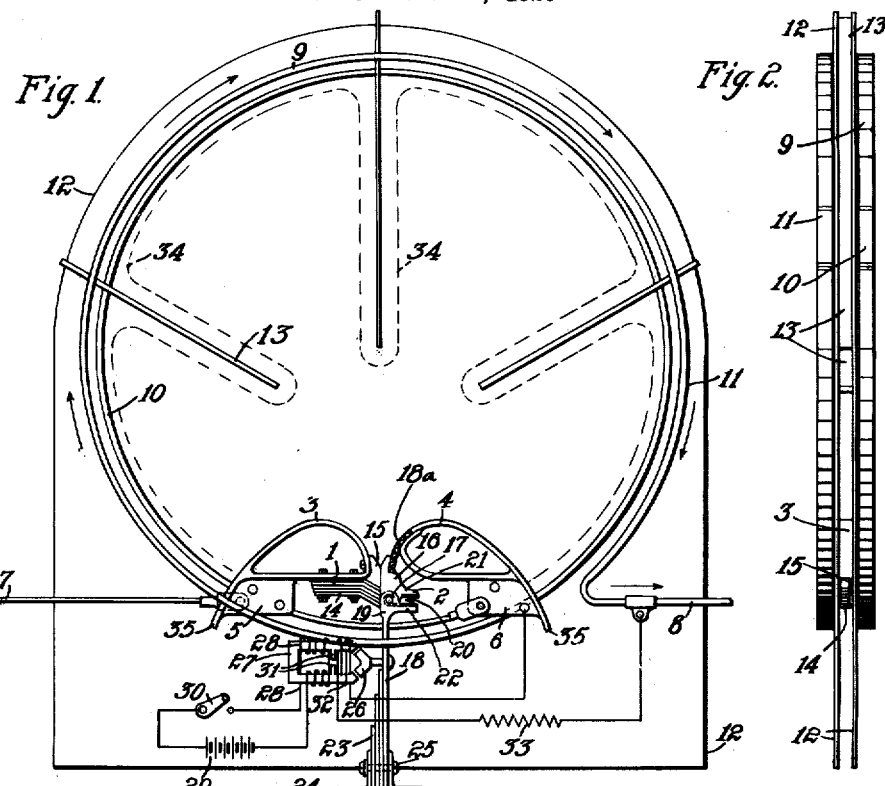
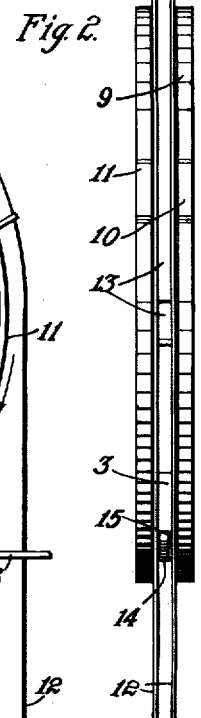
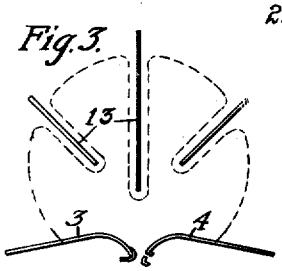
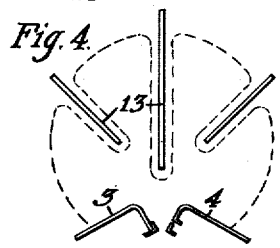
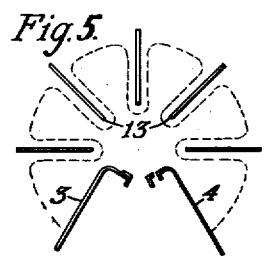
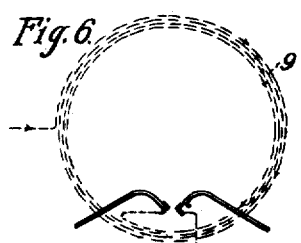
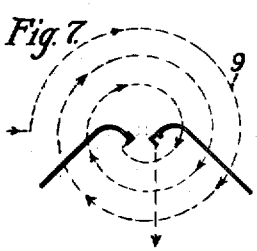
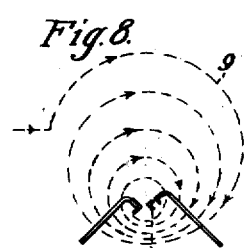
WITNESSES:
H. T. Shelhamer
F. H. Miller
INVENTOR
Joseph W. Legg
BY
Wesley J. Carr
ATTORNEY March 31, 1925.  
J. W. LEGG  
ELECTRIC ARC CONTROL  
Filed Dec. 21, 1920  
1,531,668  
2 Sheets-Sheet 2
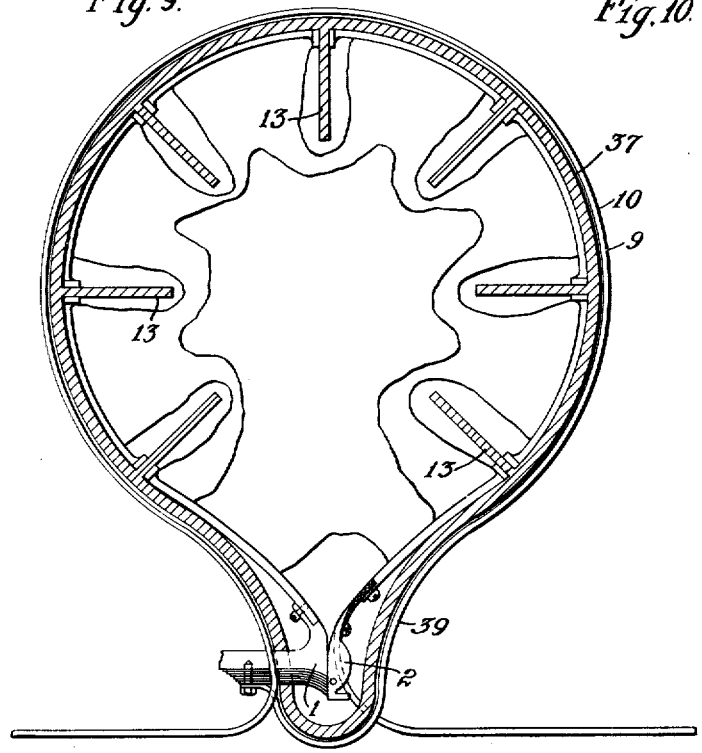
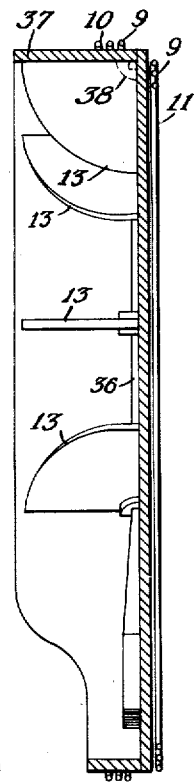
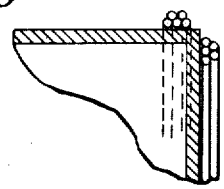
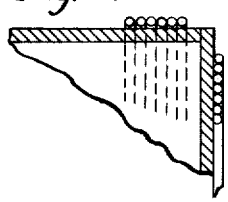
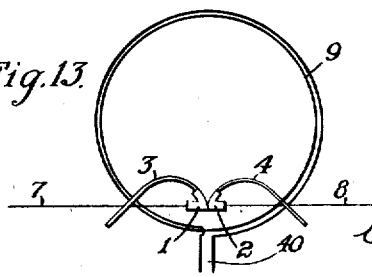
WITNESSES:
INVENTOR  
Joseph W. Legg  
BY  
ATTORNEY Patented Mar. 31, 1925.

1,531,668

UNITED STATES PATENT OFFICE.

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC-ARC CONTROL.

Application filed December 21, 1920. Serial No. 432,322.

*To all whom it may concern:*

Be it known that I, JOSEPH W. LEGG, a citizen of the United States, and a resident of Wilkinsburg, in the county of Allegheny and State of Pennsylvania, have invented a new and useful Improvement in Electric-Arc Controls, of which the following is a specification.

My invention relates to means for controlling electric arcs and particularly to such means as are adapted for use in connection with circuit interrupters.

One object of my invention is to provide means for controlling and definitely limiting the path of travel of an arc.

Another object of my invention is to provide means for so stabilizing an arc as to permit it to be formed to substantially any length and shape and to be controlled and manipulated substantially the same as if it were of flexible incandescent material.

Heretofore, electric arcs have had more or less unstable and uncontrollable characteristics. That is, in unconfined arcs or arcs formed in the atmosphere, while damping magnets and barriers have been employed to reduce and limit the travel of the arcs to a certain extent, the arcs have been so subject to varying currents and voltage conditions as to render the operation of the arcing devices uncertain.

To the best of my knowledge, heretofore there has been no means for placing a relatively long arc under absolute control in the atmosphere, and no means, even in the cases of confined arcs, such as those confined in gas and vapor tubes, whereby the arc could be formed in a definite stable stream.

While the primary object of my invention is to so expand an arc of a circuit interrupter as to insert resistance in the circuit to thereby permit the opening of a high-potential circuit with little expenditure of energy and with little explosive demonstration, the control of Paulsen arcs, the transfer of arcs from one position to another and from one medium to another, and the use of an arc that will function and appear similar to a blow torch are contemplated.

In practicing my invention, I provide means adjacent to arc-forming members for setting up a magnetic-flux field of substantially any desired outline within which an arc will be absolutely confined and that may be so stabilized as to form a substantially stationary incandescent stream. In connection with a circuit interrupter, this stream may be caused to break before or after reaching its ultimate position or it may be caused to form in its ultimate position with sufficient strength to be maintained until broken by the discharge of a condenser of small capacity thereacross or by other means.

Figure 1 of the accompanying drawings is a diagrammatic side elevational view of a circuit interrupter embodying my invention, one side of an arc chute thereof being omitted for the sake of clearness;

Fig. 2 is a central sectional view taken at right angles to Fig. 1;

Figs. 3 to 8, inclusive, are views, similar to Fig. 1 but on a reduced scale, of modified forms of my invention showing different arrangements of coils and arc-splitting members;

Figs. 9 and 10 are views, similar to Figs. 1 and 2, of a further modification of my invention;

Figs. 11 and 12 are detail sectional views of portions of the devices shown in Figs. 9 and 10 and illustrating alternative arrangements of coils thereon and Fig. 13 is a diagrammatic view of a further modified form of my invention.

As shown in Figs. 1 and 2, stationary and movable contact members 1 and 2, respectively, are provided with similar horn-gap members 3 and 4 having portions 5 and 6 to which series related conductors 7 and 8, constituting portions of a circuit to be protected, are secured. Entering at the conductor 7, current passes through the contact members 1 and 2 and around a coil 9 to the conductor 8. The coil 9 is divided into laterally spaced layers 10 and 11 between which the contact members 1 and 2 and side members 12, preferably of asbestos and constituting an arc chute, are disposed. Arc splitting or deflecting members 13 are disposed between the side members 12 and extend substantially radially with respect to the center of the coil 9.

The stationary contact member 1 comprises a lower laminated main contact portion 14 and an upper auxiliary contact member or arcing tip 15. The movable contact member 2 has an arcing-tip portion 16, pivoted by a pin 17 to an arm 18. The upper end of the arm 18 constitutes a main contact portion 19 for co-operation of the main contact portion 14 of the contact member 1. The arcing-tip portion 16 is biased in a counter-clockwise direction about the pin 17 by means of a spring 20 disposed between arms 21 and 22 on the arcing contact member 16 and on the arm 18, respectively, and may be relatively movably connected to the horn-gap member 4 by a flexible conducting member 18ª. The arm 18 may be of relatively long, resilient strap material against which outer layers 23 of similar material are disposed at the lower portion thereof and secured thereto and to bars or bracket members 24 by bolts 25 to constitute a resilient structure that is biased in a clockwise direction with respect to the member 24.

An armature 26 is secured to the arm 18 and cooperates with a core member 27 that is energized by coils 28 to hold the interrupter in its closed position. The coils 28 are supplied with energy from a battery 29 through a switch 30. The core member 27 has inwardly-projecting portions 31 constituting a shunt path for the magnetic flux of the core member upon energization of the coil 32 that is connected in shunt relationship to the coil 9, through a limiting resistor 33. This resistance reduces the time constant $\left(\frac{L}{R}\right)$ so that it is small as compared with that of the coil 9.

In operation, upon the occurrence of a sudden overload in the circuit of the conductors 7 and 8, the coil 9 will function as a reactor, thereby shunting current through the coil 32 to cause the flux of the core member 27 to be so deflected as to pass across the projections 31 instead of through the armature 26. This releases the armature 26 and permits the arm 18 to move in a clockwise direction to separate the contact members 1 and 2. When the contact members 1 and 2 separate, an arc will start outwardly therefrom and move along the horn-gap members 3 and 4. Ordinarily, such an arc would blow out indefinitely, depending upon the force behind it, and either break to open the circuit or re-ignite adjacent to the contact members.

In the construction shown, current flowing through the arc and in series with the coil 9 creates a reverse flux beyond the perimeter of the coil 9, beyond which the arc cannot pass and, depending upon the proportions of the coil and the characteristics of the circuit, will either break before it reaches the reverse flux beyond the coil 9 or assume a position shown by a dotted line 34, where it will remain until the stored energy of the circuit has been dissipated. The flux density within the coil is unidirectional and nearly uniform.

The horn-gap members 3 and 4 are curved outwardly to end portions 35 located beyond the perimeter of the coil 9 to prevent the possibility of the arc forming on the under side of the horns. The arc-splitters 13 may be arranged in various ways to lengthen the arc in any suitable manner.

Figs. 3, 4, and 5 show various modified arrangements of the arc-splitters 13 and the horn-gap members 3 and 4.

As shown in Fig. 6, the coil 9 is formed as a closely-wound spiral having a relatively large open center, in Fig. 7, as a uniformly distributed spiral and, in Fig. 8, as an eccentric spiral.

With the above arrangements the arc will be blown outwardly but cannot expand beyond the limits of the coils. The arc-splitters 13 extend somewhat beyond the coils and the arc is kept in by the side members 12. The arc cannot pass beyond the splitters to re-ignite.

The number of turns in the coil 9 may be chosen to give any desired blow-out effect and need not be very great. The number of turns will depend on the number of lines of flux per square inch per ampere required and upon the current and voltage to be handled. Thus, the arc will be extended quickly to a predetermined length to insert the resistance of the arc in the circuit until the stored energy of the system has been dissipated. This will decrease the voltage surges and, at the same time, quickly decrease the current to such value that interruption of the circuit may be readily effected.

Figs. 9 to 12, inclusive, show a modified form of magnetic blow-out device of the air-core type. The coil 9 is located outside a retaining wall 36 having a substantially right-angled, perimetral flange 37 adjacent to which the portions 10 and 11 of the coil 9 are disposed. The arc-splitters 13, in this instance, are quadrants disposed between the wall 36 and the flange 37. The coil 9 is shaped, at its lower portion 39, to give the greatest flux density adjacent to the contact members 1 and 2.

With the arrangement of the coils shown in Figs. 9, 10, 11 and 12, one about the curved outside surface of the flange 37 and the other against the outside of the plate 36, there will be a position of substantially zero flux between the coils near the inside corner 38 of the structure. The arc will expand to this position and have no further tendency to move.

As indicated in Fig. 13, the coil 9, of any of the above described forms of my invention, may be independent of the main circuit and excited, through conductors 40, from a separate source of supply (not shown).

While I have shown and described particular forms of my invention, changes may be effected therein without departing from the spirit and scope thereof, as set forth in the appended claims.

I claim as my invention:

1. The combination with electrical terminal members between which an arc may be established, of means for stabilizing said arc and so limiting its path that it is caused to assume a definite path of predetermined shape.

2. The combination with electrical terminal members between which an unconfined arc may be established, of means for limiting the growth thereof and maintaining the arc stream in a definite path.

3. The combination with electrical terminal members between which an arc may be established, of means connected to the arc circuit for stabilizing said arc and limiting its path within predetermined limits.

4. The combination with electrical terminal members between which an arc may be established, of inductance means for stabilizing said arc and limiting its path within predetermined limits.

5. The combination with electrical terminal members between which an arc may be established, of means for stabilizing said arc and moving the same to a definite path of predetermined shape.

6. The combination with electrical terminal members between which an unconfined arc may be established, of means for causing the arc to assume a predetermined form and limiting its path to the said form.

7. The combination with a pair of contact members, of means for establishing an electromagnetic field therebetween beyond which an arc cannot travel.

8. The combination with electrical terminal members between which an arc may be established, of an air-core blowout coil disposed circumferentially of the terminal members.

9. The combination with electrical terminal members between which an arc may be established, of an air-core coil for limiting the length of the arc stream.

10. The combination with electrical terminal members between which an arc may be established, of means for establishing a definite magnetic-flux zone of substantially any desired form and density adjacent to said members for controlling the arc.

11. In a circuit interrupter, the combination with relatively movable contact members, of a coil of relatively great diameter disposed with the contact members opposite a pole face thereof, the arrangement preventing an arc from passing beyond the perimeter of the coil.

12. In a circuit interrupter, the combination with relatively movable contact members, of a coil of relatively great diameter disposed with the contact members opposite and adjacent to one edge of a pole face thereof, the arrangement preventing an arc from passing beyond the perimeter of the coil.

13. In a circuit interrupter, the combination with relatively movable contact members, of a coil wound in two layers disposed on opposite sides of the contact members.

14. In a circuit interrupter, the combination with relatively movable contact members, of a coil of relatively great diameter disposed with the contact members opposite a pole face thereof, and arc-splitting members disposed substantially radially around said coil.

15. In a circuit interrupter, the combination with relatively movable contact members, of a coil wound in two layers to create a definite perimetral flux zone for affecting an arc.

16. The combination with electrical arcing members, of means for establishing a suspended stable arc stream of predetermined selective shape and for moving the same from one predetermined position to another.

17. The combination with electrical arcing members, of means for establishing an electromagnetic-flux field substantially parallel to an elongated arc to position and stabilize the arc.

In testimony whereof, I have hereunto subscribed my name this 13th day of December 1920.

JOSEPH W. LEGG.

DISCLAIMER 1,531,668.—*Joseph W. Legg*, Wilkinsburg, Pa. ELECTRIC-ARC CONTROL. Patent dated March 31, 1925. Disclaimer filed February 28, 1933, by the assignee, *Westinghouse Electric & Manufacturing Company*.

Hereby enters the following disclaimer, to wit:

1. Your petitioner hereby disclaims the subject-matter of claim 8, except structures in which the line connecting the contact members while open is at least approximately parallel to the plane of the coil and in which the blow-out coil is disposed circumferentially of at least a portion of each terminal member for all positions of said terminal members.

2. Your petitioner hereby disclaims the subject-matter of claim 10, except structures in which the means for establishing a definite magnetic flux zone comprises a coil positioned with its plane at least approximately parallel to the line connecting the contact members while open and in which at least a part of each electrical terminal member, in all operative positions thereof, lies within the perimeter of the coil.

3. Your petitioner hereby disclaims the subject-matter of claim 13, except structures in which the line connecting the contact members while open is at least approximately parallel to the plane of the coil and in which at least a part of each contact member, in the wide open position, lies within the perimeter of the coil.

4. Your petitioner hereby disclaims the subject-matter of claim 15, except structures in which the line connecting the contact members while open is at least approximately parallel to the plane of the coil and in which at least a part of each contact member, in wide open position, lies within the perimeter of the coil and in which also the fraction of said perimeter embraced within the confines of each said contact member is small.

[*Official Gazette April 11, 1933.*]